United States Patent
Turpin, Jr.

[15] 3,683,366
[45] Aug. 8, 1972

[54] DISPLAY BOARD FOR MONITORING A FLEET OF VEHICLES

[72] Inventor: Raymond C. Turpin, Jr., 3825 Wieuca Terrace, N.E., Atlanta, Ga. 30305

[22] Filed: Feb. 27, 1970

[21] Appl. No.: 15,091

[52] U.S. Cl..................340/325, 340/23, 235/92 AC, 235/92 PD, 235/61.5 R
[51] Int. Cl..............................................G06m 3/08
[58] Field of Search ...340/286, 325, 23, 24, 325 XR, 340/324, 330; 235/92 AC, 92 PD, 92 DP, 61.5 R, 61.5 E

[56] References Cited

UNITED STATES PATENTS

| | | |
|---|---|---|
| 2,985,368 | 5/1961 | Kohler et al. ........340/286 UX |
| 3,441,719 | 4/1969 | Haller et al...................235/92 |
| 3,351,912 | 11/1967 | Collom et al..........235/92 UX |

Primary Examiner—John W. Caldwell
Assistant Examiner—William M. Wannisky
Attorney—Beveridge and De Grandi

[57] ABSTRACT

A display board for monitoring the activities of a fleet of vehicles engaged in transporting materials between a central site and a plurality of outlying sites includes an order status section, a vehicle status section and a haul status section.

The order status section is segregated into areas which correspond to each outlying site with digital counters displaying the cumulative quantity of materials dispatched to each outlying site. Adjacent to each counter there is a device for holding a card indicating the particulars of the particular outlying site.

The vehicle status section is segregated into areas corresponding to the individual vehicles in the fleet. Visually changeable indicators show whether the associated vehicle is inoperable, in use or operable but not in use.

The haul status section is segregated into areas which correspond to active vehicles or other working units. In the case of vehicles, each of these areas has visually changeable indicators which identify the outlying site being served by the vehicle, present activity of the vehicle and a timer which indicates the length of time the vehicle has been engaged in such activity.

20 Claims, 4 Drawing Figures

PATENTED AUG 8 1972  3,683,366

INVENTOR
RAYMOND C TURPIN

BY Beveridge & DeGrandi
ATTORNEYS

DISPLAY BOARD FOR MONITORING A FLEET OF VEHICLES

BACKGROUND OF THE INVENTION

The apparatus disclosed in this specification is intended for use in monitoring the activities of a fleet of vehicles which are engaged in transporting materials between a central site and a number of outlying sites. It is susceptable for use in conjunction with many types of activities involving various types of vehicles and various types of materials. Some features of the apparatus, particularly features used in the haul status section, may be used to maintain a display of the activities of other "working units" such as the activities of individual workers engaged in activities. The envisioned principal use however, is in dispatching and controlling a fleet of ready-mixed concrete trucks between a central site hereinafter referred to as the plant, and a plurality of outlying sites which are referred to hereinafter as jobs. Throughout the following description, reference will be made to the activities of such a fleet of trucks, without the intention of limiting this apparatus to such utilization.

The ready mixed concrete industry has recognized for some time the need for monitoring the status of the jobs in progress and the vehicles in the fleet. This has been done through the use of a number of dispatch sheets which carry the customer name and job title, the yards of concrete ordered, the date and time to be delivered, the type of concrete, the number of trucks needed or the rate of flow needed in yards per hour, the identifying numbers of the trucks used for the order and the cumulative total of yards dispatched to the job. The activities of each individual truck have been displayed on status boards which have individual areas for each truck in use. Colored indicators are used to indicate whether the particular truck is enroute to the job, waiting at the job to unload, enroute from the job to the plant or standing by at the plant to reload. The times when any of these activities commence are sometimes recorded manually by the dispatcher who maintains contact with the trucks through a two-way radio.

These prior practices are extremely demanding on dispatchers who receive a mass of rapidly arriving data, answer the telephone, maintain radio contact with the trucks and write delivery tickets. Analysis of the overall status of the jobs and the vehicles is difficult in view of the piecemeal way in which it is recorded and displayed.

The apparatus of the present invention overcomes the complications and confusion resulting from use of previous techniques for monitoring the activities of the jobs and vehicles. One display board is provided with jobs status areas which identify the jobs-in-progress and the cumulative amount of materials delivered to each such job; a truck status area which indicate which trucks in the fleet are in use, inoperative or operative but not in use; and a haul status area which includes visually changeable indicators to display the nature of the activity in which a vehicle is engaged and timer means which are automatically zeroed upon changing of the indicators in order to display the period of time during which the vehicle has been engaged in such an activity.

SUMMARY OF THE INVENTION

Several inventive concepts are believed to exist in the apparatus disclosed in this specification. First, is the use of a display board which includes the job status areas, the truck status areas and the haul status areas in order to provide a convenient visual correlation between the entire fleet of trucks, the portion of the fleet which is in operation and the jobs which are in progress.

Another important concept involves the use of job status areas which carry the particulars of the jobs-in-progress including the cumulative amount dispatched to such jobs, together with the haul status area which indicate particular vehicles, the jobs being served by the particular vehicles and the loaded or unloaded condition of the particular vehicles.

A further feature embodied in the disclosed apparatus involves the use of digital counters in the job status area in order to reflect the cumulative amount of goods dispatched to the job. These digital counters are selectively connected to a single keyboard or counter actuating device which may be located in the job status section of the apparatus.

Still another significant feature of this apparatus pertains to the haul status section where changing of the visual status indicators also resets or zeros a timer, so that the dispatcher may monitor the time interval during which a single truck has been engaged in its present activity.

BRIEF DESCRIPTION OF THE DRAWINGS

The advantages resulting from apparatus which embodies any of these inventive features may be appreciated by a study of the following description and the accompanying drawings wherein;

In FIG. 1, the job status section is designated 2, the vehicle status section is designated 4 and the haul status section is designated 6.

DESCRIPTION OF THE PREFERRED EMBODIMENTS

Figure 1:
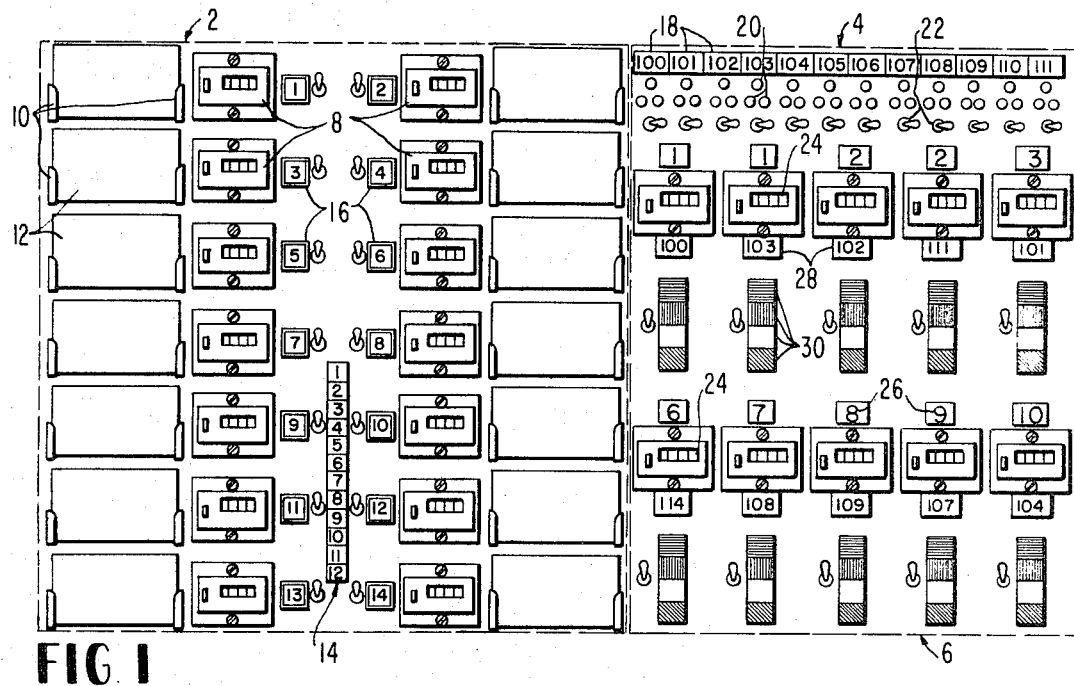
FIG. 1 is a view of the face of a display board embodying the features of this invention.

As previously mentioned, the job status section is used to display information pertaining to the individual jobs-in-progress including the cumulative amount of materials dispatched to each job. Each job is represented by a digital counter 8 which is adjacent to a pair of card-holding clips 10. The job order cards 12 are held within the clips 10 and carry the customer's name and job title, the yards of concrete desired in one continuous placement, the date and time the concrete is to be delivered, the type of concrete and the number of trucks needed or the rate of flow needed in yards per hour. Manually operated switches and associated lamps (not shown) may be used to indicate which orders are in the process of being filled.

The counters 8 are of the well known rotary wheel type and are constructed in a known fashion to advance one increment each time they receive an electrical pulse from a stepper device described later in this specification. Other types of display devices such as Nixie tubes may be used in lieu of the rotary counters.

Adjacent to the counters 8 is a yardage keyboard 14 which, as illustrated, includes 12 keys which are used to indicate the volume of material carried in a dispatched vehicle. Job selector actuators 16 are located adjacent to each counter and carry identification numerals for the particular job.

Whenever the dispatcher sends a vehicle to a particular job with a load, he depresses the appropriate yardage key on the keyboard 14 and then the appropriate job selector actuator 16 which will automatically advance the designated cumulative yardage counter 8 a number of increments corresponding to the depressed key on the yardage keyboard 14.

The vehicle status section has a set of permanent number 18 which correspond with and symbolize the identification numbers on the individual vehicles in the fleet. Beneath each of these numbers 18 is a set of three illuminated indicators 20 which are of different colors to signify whether the particular vehicle is inoperable, in use, or operable but not in use. Adjacent to each set of three indicators 20, there is a three-position switch actuator 22 which may be selectively positioned to illuminate any one of the three indicators 20 to provide a visual display of the status of the vehicle.

The haul status section 6 is used to display the activities of the vehicles which are in use. Within this section, there are a number of haul status areas, each of which has a timer 24. Preferably, all of the timers are connected in parallel to a circuit which is energized with a timer-advancing pulse once each minute. Such a pulse may be created by a direct current circuit including contacts which are closed once each minute by a motor driven notched cam.

Movable magnetic numerals 26 correspond to the job numbers in order status section 2 in order to identify which job is being served by the particular vehicle. Movable magnetic vehicle symbolizing members 28 are numerals which identify the individual vehicles in operation. The dispatcher may view the haul status section to learn which vehicles are working on which jobs and vice versa.

Beneath each of the timers 24 is a set of four illuminable push buttons 30 which broadly will indicate whether a vehicle is loaded or unloaded and more specifically will indicate whether the vehicle is enroute to a job, waiting to unload, returning to the plant or waiting to load at the plant.

In each set of the push buttons 30, the depressed push button remains lighted, and depression of any button will release all other buttons in that set. The buttons are color-coded to indicate the particular activity of the vehicle, i.e. whether it is enroute to the job, waiting to unload, returning to the plant or waiting to reload.

Depression of any of the push buttons 30 will also cause the timer 24 thereadjacent to automatically reset to zero. Since all timers are advanced once each minute, the dispatcher need only look at the timers 24 to learn how long a vehicle has been engaged in a given activity designated by the illuminated button 30. If there is a backup of vehicles waiting to unload, this will readily become apparent by glancing at the haul status section 6. Similarly, any other impediments to the efficient movement of the vehicles may be picked up quickly by the dispatcher.

When the concrete plant is in operation, the dispatcher is in radio communication with the vehicles who periodically will report changes in their activities which correspond to any of the buttons 30. When receiving such information, the dispatcher merely depresses the appropriate button 30 to light the button and reset the timer. When a job is completed, the dispatcher may assign a given truck to another job and change the appropriate magnetic numerals 26. When one truck is substituted for another on a particular job, the numbers 28 are changed to reflect which vehicles are engaged in filling a particular order.

Figure 3:
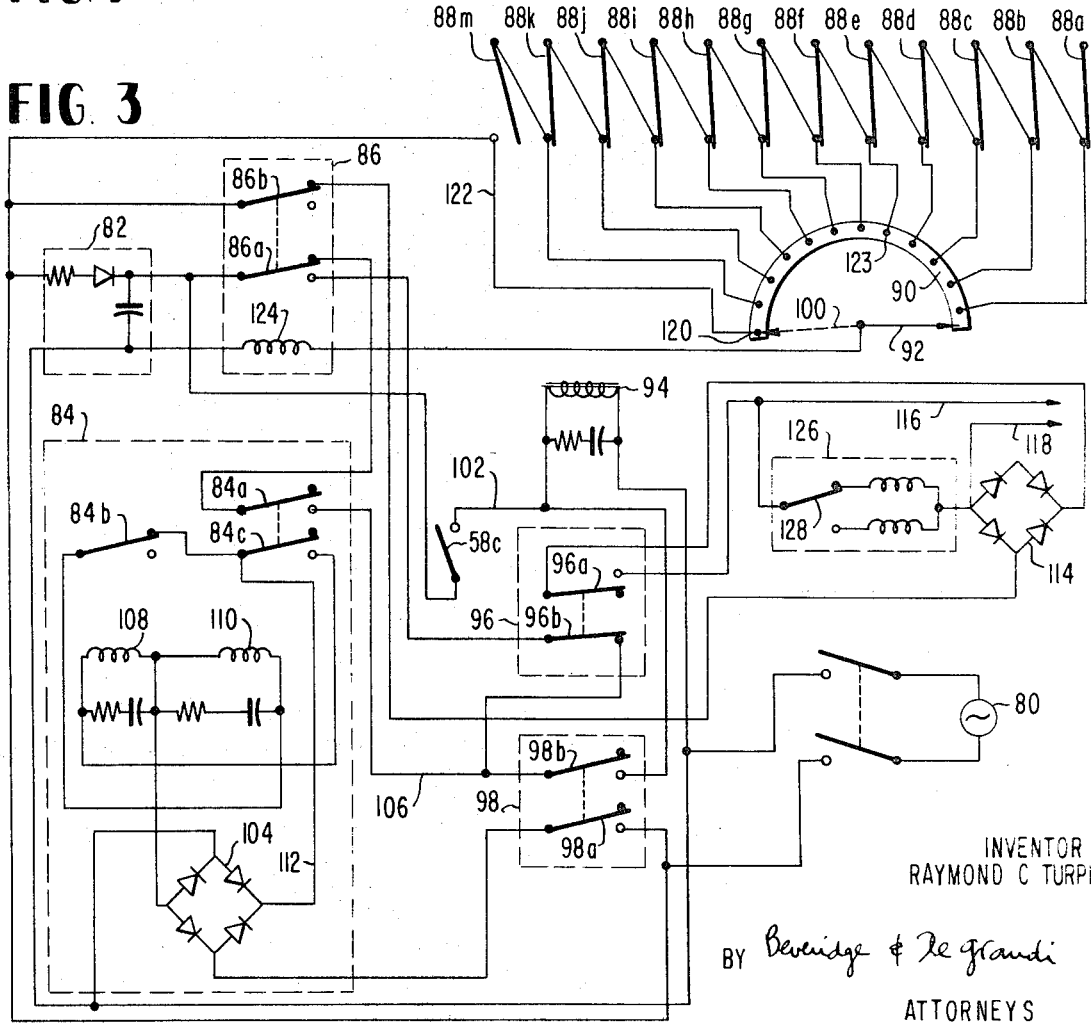
FIG. 3 is a schematic wiring diagram of the circuitry for actuating the cumulative yardage counters in the job status section.
Figure 2:
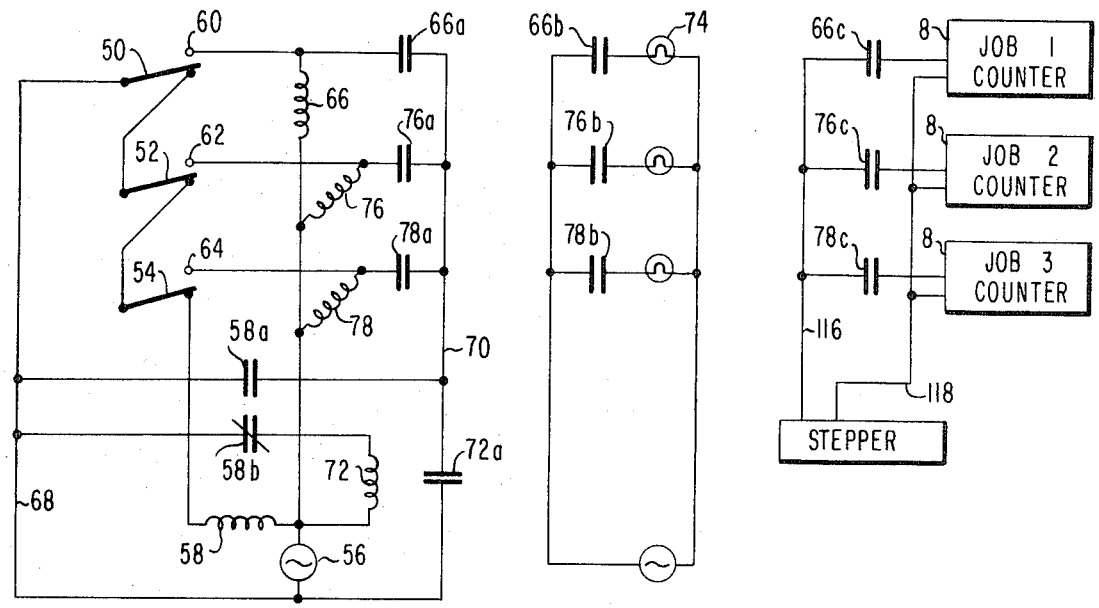
FIG. 2 is a wiring diagram of the job selector relay circuit of the type used in the job status section.
Figure 4:
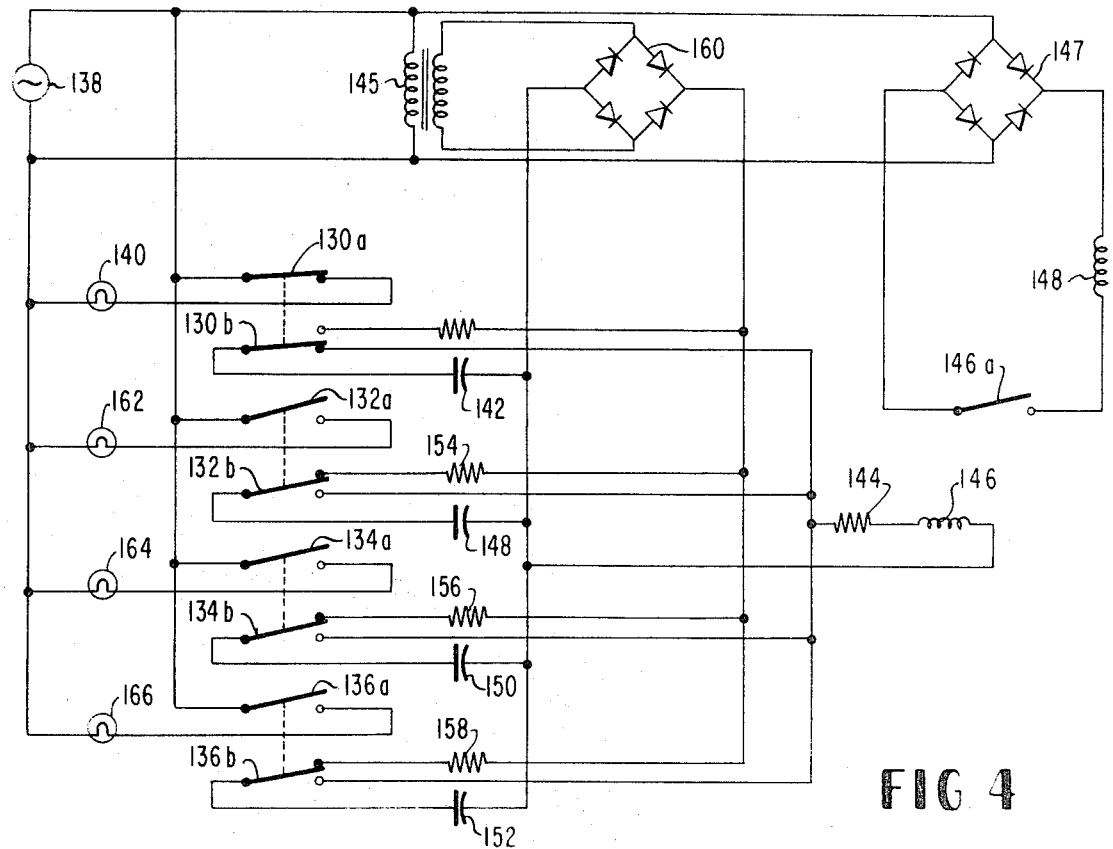
FIG. 4 is a schematic wiring diagram of the circuit used in a single haul status area of the apparatus.

Suitable circuits for operating the apparatus are shown in FIG. 2, 3 and 4.

FIG. 2 illustrates the circuitry which operates in response to depression of the job selector buttons 16 in the job status section 2. In order to simplify this explanation, FIG. 2 depicts only three of the yardage counters. In FIG. 2, the manually operated switches 50, 52 and 54 are shown in their normal positions where they complete a circuit from one side of an alternating current source 56, through relay windings 58 and to the other side of the source 56. When so arranged, the relay contacts 58a are closed and the contacts 58b are open.

When the dispatcher presses any of the job selector buttons 16 he will open the series circuit which previously existed through the switches 50, 52 and 54, thereby deenergizing the relay coil 58, opening contacts 58a and closing contacts 58b. When the switch is fully depressed, it will make contact with the corresponding upper contact 60, 62 or 64. If switch 50 is moved into conductive relationship with the contact 60, the relay winding 66 will be energized to close the associated relay contacts 66a, so that the relay windings 66 will be energized both from the conductor 68 and the conductor 70 which is connected to the alternating current source through the contacts 72a of a slow release relay having windings 72 which are connected across the alternating current source through the closed contacts 58b.

Release of the button 50 will interrupt the circuit between the conductor 68 and the switch contact 60; however, the relay windings 66 remain energized due to the circuit which is completed through the contacts 72a of the slow release relay. Return of the switch 50 to its original position which is illustrated in FIG. 2 will again energize the relay windings 58 to close the contacts 58a and maintain the conductor 70 in an energized condition. At this time, the relay windings 66 remain energized to keep the contacts 66a, 66b and 66c in a closed condition. The closing of the contacts 66b will energize the lamp 74 which may be located in or adjacent to the corresponding job selector button 16 shown in FIG. 1. This will provide a visual indication of which job yardage counter is connected to the counter-advancing circuit.

If the dispatcher then actuates the switch 52, the relay windings 58 will become deenergized, thereby opening the relay contacts 58a and interrupting the current path to the relay windings 66. This, of course, opens the contacts 66a, 66b and 66c. Arrival of the switch 52 against the contact 62 will energize the relay windings 76 and close its associated contacts 76a, 76b and 76c. These will remain closed in the same fashion as the contacts 66a, 66b and 66c discussed in the preceding paragraph. In a like manner, operation of the switch 54 will close the relay having the windings 78 and the contacts 78a, 78b and 78c.

In the preceding discussion, the slow release relay having the windings 72 and the contacts 72a has been simplified for convenience of description. This slow release relay may include a rectifier bridge providing full-wave rectification and relay windings connected in parallel to an R-C circuit in order to provide a delayed opening of the contacts 72a.

The means for advancing the yardage counters 8 in the job status section 2 is shown in FIG. 3. Its principal elements are the alternating current source 80, a main rectifier assembly 82, an oscillating relay assembly 84, a reset relay 86 and a stepper assembly which includes a number of switches 88a–88m which are biased to a closed position and opened by depression of corresponding keys on the yardage keyboard 14. The stepper assembly also includes a commutator 90 connected to the switches 88a–88k, a stepper armature contact arm 92, a stepper motor assembly 94, stepper interrupter springs or contacts 96 and stepper off-normal springs or contacts 98. The contacts 96 and 98 are operated by cams on the stepper armature, with the contacts 96 opening and closing for each increment of stepper movement and the contacts 98 closing whenever the stepper armature is displaced from its idle position shown at 100.

Broadly speaking, the function of the stepper off-normal springs 98 is to energize the oscillating relay assembly 84 which feeds current pulses to the stepper motor 94, with each pulse advancing the stepper one incremental position. As the stepper motor moves through each position, the upper contacts of the interrupter springs 96 are momentarily shifted to create a current pulse which is directed to the job yardage counters 8 shown in FIGS. 1 and 2. When the stepper has advanced the appropriate yardage counter the proper number of increments, the reset relay 86 is actuated to return the stepper armature 92 to its idle position without sending any further pulses to the yardage counters.

The stepper motor 94 is constructed to move the stepper armature contact 92 in a counterclockwise direction to the position shown in solid lines in FIG. 3 when subjected to a constant source of direct current, and it moves the stepper armature contact 92 one increment counterclockwise when it receives a momentary pulse of direct current. At the completion of stepper operation, the armature contact 92 lies at the idle position designated 100.

When the dispatcher depresses one of the job selector actuators 16 shown in FIGS. 1 and 2, the relay coil 58 (FIG. 2) is deenergized and the contacts 58c (FIG. 3) are closed, thereby carrying direct current through the conductor 102 from the main rectifier assembly 82 to the stepper motor 94. This "cocks" the stepper armature contact 92 to the position shown in solid lines in FIG. 3. This closes the off-normal contacts 98 so that contacts 98a will energize the rectifier bridge 104 and its associated oscillating relay circuit 84. The upper contacts 98b of the off-normal springs are closed so that the pulsating direct current produced by opening and closing of the main contacts 84a of the oscillating relay will be carried by the conductor 106 to the stepper motor 94. Power to the contacts 84a is taken from the main rectifier assembly 82 and through the lower contacts 86a of the reset relay 86.

The oscillating relay assembly 84 is of a well known type and includes a pair of relay switch elements 84b and 84c which are moved respectively by the windings 108 and 110, each of which has an R-C circuit wired in parallel thereto.

When the rectifier bridge 104 is energized by closing of the off-normal switch 98a, the windings 110 are energized by current flowing through the conductor 112 and the contacts 84b. This closes the contacts 84a and 84c, with the contacts 84a sending current through the conductor 106 and contacts 98b of the off-normal assembly to the stepper motor 94 to advance the stepper one increment. As this is taking place, the closed contacts 84c complete a circuit to the windings 108 which then open the contacts 84b and deenergize the circuit to the windings 110. A suitable time delay is created through the R-C circuits across the windings 108 and 110 so that they are alternatively operated in order to provide the desired continuous opening and closing of the contacts 84a and consequent movement of the stepper motor.

If the switch 88m is opened shown in FIG. 3, the stepper armature contact will move through 12 increments, with the switches in the stepper interrupter 96 opening and closing for each incremental movement. During this period, the upper contacts 96a are closed and opened twelve times to send pulses of direct current from the rectifier bridge 114 through the conductors 116 and 118 to the appropriate yardage counter through the closed contact 66c, 76c and 78c (FIG. 2). At the end of the movement of the stepper armature, it contacts the point 120 which is connected through conductor 122 to one side of the alternating current source, thereby energizing the windings 124 of the reset relay 86. This moves the upper contact 86b downwardly to deenergize the rectifier bridge 114.

If the dispatcher is only sending 4 yards to a particular job, he presses the button on keyboard 14 which opens the switch 88d. This will close switch 88m. Then, as the stepper moves in its counterclockwise path it will not actuate the windings 124 of the reset relay 86 until it has closed and opened the switch 96a four times and advanced the appropriate counter through four increments. When the armature 92 touches contact 123, it will complete a circuit through the switches 88e–88m and will energize the windings 124 of reset relay 86. In this instance, the upper contacts 86b of the reset relay will open so that the pulse rectifier 114 will be deenergized. Downward movement of the lower contacts 86a of the reset relay will connect the output of the main rectifier assembly 82 with the lower contacts 96b of the stepper interrupter springs. When the stepper armature 92 is in contact with one of the conductive portions of commutator 90, there will be a flow of current through the lower contacts 98b of the stepper off-normal springs to the stepper motor 94, thus advancing it one increment, whereupon it again receives a pulse through the contacts 96b. This will continue until the stepper armature contact returns to its idle position shown at 100.

From the foregoing description, it would be appreciated that the number of active incremental movements of the stepper armature 92 will depend upon which of the switches 88a–88m is opened.

FIG. 3 also illustrates diagramatically a totalizing yardage counter at 126 with a switch 128 being used to actuate different windings which will either add or subtract from the quantity shown on the totalizing counter.

FIG. 4 depicts the circuitry involved in each of the areas of the haul status section of the apparatus. Each of the pushbuttons 30 shown in FIG. 1 is connected to a corresponding switch having two sets of contacts. These switches are commercially available and are typified by the Switchcraft four station interlocking assembly, No. 37041. As previously described, each station on the switch assembly is used to indicate a particular activity in which a truck or other working unit is engaged. For example, pressing the button associated with the contacts 130a and 130b may be performed when a loaded is dispatched to a job. The contacts 132a and 132b may be moved downwardly when the truck driver informs the dispatcher that he is at the job and waiting to unload. The contacts 134a and 134b are moved downwardly when the dispatcher is informed that the truck has unloaded and is returning to the plant, and the contacts 136a and 136b are moved downwardly when the driver informs the dispatcher that he is at the plant and waiting to reload.

FIG. 4 shows the contacts 130a and 130b in their actuated position which they maintain until another button is pushed. In this position, the contacts 130a connect the alternating current source 138 with the indicator lamp 140 which may be located within a transparent or translucent portion of the associated pushbutton. As mentioned previously, these pushbuttons may be color-coded to indicate visibly the particular activity in which a vehicle is engaged.

The closed contacts 130b complete a closed circuit which includes the capacitor 142, resistor 144 and relay windings 146. The capacitor 142 is in its discharged condition so no current is flowing through the relay windings 146. In the illustrated position, the contacts 132b, 134b and 136b each connect their associated capacitors 148, 150 and 152 through a resistor 154, 156 and 158 across a direct current source which may be a full wave rectifier bridge 160 energized by a stepdown transformer 145. This causes the capacitors 148, 150 and 152 to take on a charge equal to the potential of the direct current source 160. Shifting of any of the contacts 132b, 134 b or 136b will complete a circular from their respective capacitors through the relay windings 146, thereby closing the relay contacts 146a and connecting a rectifier bridge 147 with a timer-reset coil 148 which resets the appropriate timer to zero. At the same time, the corresponding upper switch element 132a, 134a or 136a will close the appropriate circuit to an indicator lamp 162, 164 or 166. When the dispatcher presses a single actuator, he resets the appropriate timer to zero and illuminates the proper activity indicating light.

It will be realized by a person skilled in the art that the invention disclosed hereinabove may be accomplished by various means other than the specific preferred system described in this specification. Therefore, the protection offered hereby is not to be limited only to the sole disclosed embodiment, but encompasses all modifications and substitutions therefore within the spirit of the claims which follow.

I claim:

1. A display board for monitoring the activities of a fleet of vehicles engaged in transporting materials between a central site and a plurality of outlying sites, comprising
   a. an order status section which includes a plurality of order status areas for showing the status of orders for material being transported between the central site and single outlying site, each of said order status area having:
      i. means for identifying a single outlying site;
      ii. means for designating the total amount of materials to be transported between the central site and the associated single outlying site;
      iii. means for displaying the cumulative quantity of materials transported between the central site and the associated single outlying site;
   b. a vehicle status section which includes a plurality of vehicle status areas for showing the status of individual vehicles in the fleet, each vehicle status area having:
      i. means for symbolizing an individual vehicle;
      ii. a set of visually changeable indicator means for showing whether a vehicle associated with the vehicle status area is inoperable, in use, or operable but not in use;
   c. a haul status section which includes a plurality of haul status areas for showing the status of vehicles in use, each haul status area having:
      i. order identification means corresponding to one of the means in (a)i;
      ii. vehicle symbolizing means corresponding to one of the means in (b)i; and
      iii. visually changeable indicator means for indicating whether a vehicle is loaded or unloaded.

2. Apparatus according to claim 1 wherein the means recited in portion (a)iii is a digital counter, a set of selectively operable quantity designating actuators corresponding numerically to the capacities of the vehicles in a fleet, and means responsive to operation of any of the quantity designating actuators for advancing the counter an amount corresponding numerically to the operated quantity designating actuator.

3. Apparatus according to claim 2 wherein the means for advancing the counters include pulse generating means for creating a series of pulses which correspond numerically to the operated quantity designating actuator.

4. Apparatus according to claim 2 having a single set of said quantity designating actuators, and an order selector switch means for each of the order status sections for connecting the means for advancing the counters to the counter of any selected order status section.

5. Apparatus according to claim 4 having manually operable visually changeable indicator means for showing which counter is connected to the means for advancing the counters.

6. Apparatus according to claim 5 wherein the means for advancing the counters includes pulse generating means for creating a series of pulses which correspond numerically to the operated quantity designating actuator.

7. Apparatus according to claim 1 wherein the indicator means recited in (c)iii includes means for indicating whether the vehicle is waiting to load, waiting to unload, enroute from the central site to the outlying site, or enroute from the outlying site to the central site.

8. Apparatus according to claim 1 wherein each haul status section has a timer means, and reset means for zeroing the timer means in response to changing of the indicator means recited in (c)iii.

9. Apparatus according to claim 8 wherein the indicator means recited in (c)iii is a plurality of illumination devices, first switch means for actuating each illumination means, and second switch means for actuating the reset means, said first and second switch means having a common actuator.

10. Apparatus according to claim 8 wherein the indicator means recited in (c)iii includes means for indicating whether the vehicle is waiting to load, waiting to unload, enroute from the central site to the outlying site, or enroute from the outlying site to the central site.

11. A display board for monitoring the activities of a fleet of vehicles engaged in transporting materials between a central site and a plurality of outlying sites, comprising, a plurality of order status areas for showing the status of orders for material being transported between the central site and single outlying site, each of said order status area having: means for identifying a single outlying site, means for designating the total amount of materials to be transported between the central site and the associated single outlying site, and means for displaying the cumulative quantity of materials transported between the central site and the associated single outlying site; a plurality of haul status means for showing the status of individual vehicles in use, each haul status means having means for symbolizing a particular vehicle, means for indicating which outlying site is being worked by the particular vehicle, and visually changeable indicator means for indicating whether the particular vehicle is loaded or unloaded.

12. Apparatus according to claim 11 wherein the means in the order status area for displaying the cumulative quantity of materials is a digital counter, a set of selectively operable quantity designating actuators corresponding numerically to the capacities of the vehicles in a fleet, and means responsive to operation of any of the quantity designating actuators for advancing the counter an amount corresponding numerically to the operated quantity designating actuator.

13. Apparatus according to claim 12 wherein the means for advancing the counters includes pulse generating means for creating a series of pulses which correspond numerically to the operated quantity designating actuator.

14. Apparatus according to claim 12 having a single set of said quantity designating actuators, and an order selector switch means for each of the order status sections for connecting the means for advancing the counters to the counter of any selected order status section.

15. Apparatus according to claim 14 having manually operable visually changeable indicator means for showing which counter is connected to the means for advancing the counters.

16. Apparatus according to claim 15 wherein the means for advancing the counters includes pulse generating means for creating a series of pulses which correspond numerically to the operated quantity designating actuator.

17. Apparatus according to claim 11 wherein the visually changeable indicator means in the haul status means includes means for indicating whether the vehicle is waiting to load, waiting to unload, enroute from the central site to the outlying site, or enroute from the outlying site to the central site.

18. Apparatus according to claim 11 wherein each haul status means has a timer means, and reset means for zeroing the timer means in response to changing of the visually changeable indicator means in the associated haul status means.

19. Apparatus according to claim 18 wherein the visually changeable indicator means in the haul status means is a plurality of illumination devices, first switch means for actuating each illumination means, and second switch means for actuating the reset means, said first and second switch means having a common actuator.

20. Apparatus according to claim 18 wherein the visually changeable indicator means in the haul status means includes means for indicating whether the vehicle is waiting to load, waiting to unload, enroute from the central site to the outlying site, or enroute from the outlying site to the central site.

* * * * *